(12) United States Patent
Hillel et al.

(10) Patent No.: US 9,037,520 B2
(45) Date of Patent: May 19, 2015

(54) STATISTICAL DATA LEARNING UNDER PRIVACY CONSTRAINTS

(71) Applicant: General Motors LLC, Detroit, MI (US)

(72) Inventors: Aharon Bar Hillel, Kiryat-Ono (IL); Ron M. Hecht, Raanana (IL); Nadav Lavi, Ramat-Hasharon (IL)

(73) Assignee: GM GLOBAL TECHNOLOGY OPERATIONS, LLC., Detroit, MI (US)

( * ) Notice: Subject to any disclaimer, the term of this patent is extended or adjusted under 35 U.S.C. 154(b) by 233 days.

(21) Appl. No.: 13/666,066

(22) Filed: Nov. 1, 2012

(65) Prior Publication Data

US 2014/0122385 A1  May 1, 2014

(51) Int. Cl.
*G06N 99/00* (2010.01)
*G10L 15/197* (2013.01)
*G06F 21/62* (2013.01)

(52) U.S. Cl.
CPC .......... *G06F 21/6254* (2013.01); *G06N 99/005* (2013.01); *G10L 15/197* (2013.01)

(58) Field of Classification Search
CPC .............................. G06N 99/005; G10L 15/18
USPC ............................................................ 706/12
See application file for complete search history.

(56) References Cited

PUBLICATIONS

Dimitri Kanevsky ("Telematics: Artificial Passenger and Beyond". 2008).*
Hershey et al ("Audio-Visual Graphical Models for Speech Processing" 2004.*

\* cited by examiner

*Primary Examiner* — Lut Wong
(74) *Attorney, Agent, or Firm* — Leydig, Voit & Mayer, Ltd.

(57) ABSTRACT

A computer-implemented method is provided for statistical data learning under privacy constraints. The method includes: receiving, by a processor, a plurality of pieces of statistical information relating to a statistical object and aggregating, by the processor, the plurality of pieces of statistical information so as to provide an estimation of the statistical object. Each piece of statistical information includes an uncertainty variable, the uncertainty variable being a value determined from a function having a predetermined mean. The number of pieces of statistical information aggregated is proportional to the reliability of the estimation of the statistical object.

18 Claims, 4 Drawing Sheets

US 9,037,520 B2

STATISTICAL DATA LEARNING UNDER PRIVACY CONSTRAINTS

FIELD

The present disclosure relates generally to statistical data learning.

BACKGROUND

Telematics units within vehicles provide subscribers with connectivity to a telematics service provider (TSP). The TSP provides subscribers with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

A convenient way for a user to control a telematics unit while operating a vehicle is through speech. In order to provide accurate responses to vocal commands, it is advantageous for a telematics unit to have access to a well-developed language model. However, conventional language modeling requires complex, time-consuming, and/or unsecure procedures that are difficult or costly to implement and that may expose users' private information.

The inventors have created the above body of information merely for the convenience of the reader; the foregoing is a discussion of problems discovered and/or appreciated by the inventors, and is not an attempt to review or catalog the prior art.

SUMMARY

In an implementation, the present invention provides a computer-implemented method for statistical data learning under privacy constraints. The method includes: receiving, by a processor, a plurality of pieces of statistical information relating to a statistical object, wherein each piece of statistical information includes an uncertainty variable, the uncertainty variable being a value determined from a function having a predetermined mean; and aggregating, by the processor, the plurality of pieces of statistical information so as to provide an estimation of the statistical object, wherein the number of pieces of statistical information aggregated is proportional to the reliability of the estimation of the statistical object.

In a further implementation, the present invention is implemented as computer-executable instructions stored on a tangible, non-transitory computer-readable medium.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DESCRIPTION

Before discussing the details of the invention and the environment wherein the invention may be used, a brief overview is given to guide the reader. In general terms, not intended to limit the claims, implementations of the present invention are directed towards cost-effectively constructing a reliable language model in a short amount of time based on statistics collected from many users without jeopardizing any individual user's privacy. These exemplary implementations are discussed within the context of language modeling for vehicles equipped with telematics units. However, it will be appreciated that the principles described herein are not limited to language modeling or telematics units, and may be applied to other models (e.g., with respect to vehicle parameters) and contexts as well (e.g., personal mobile devices such as cellular phones).

Figure 1:
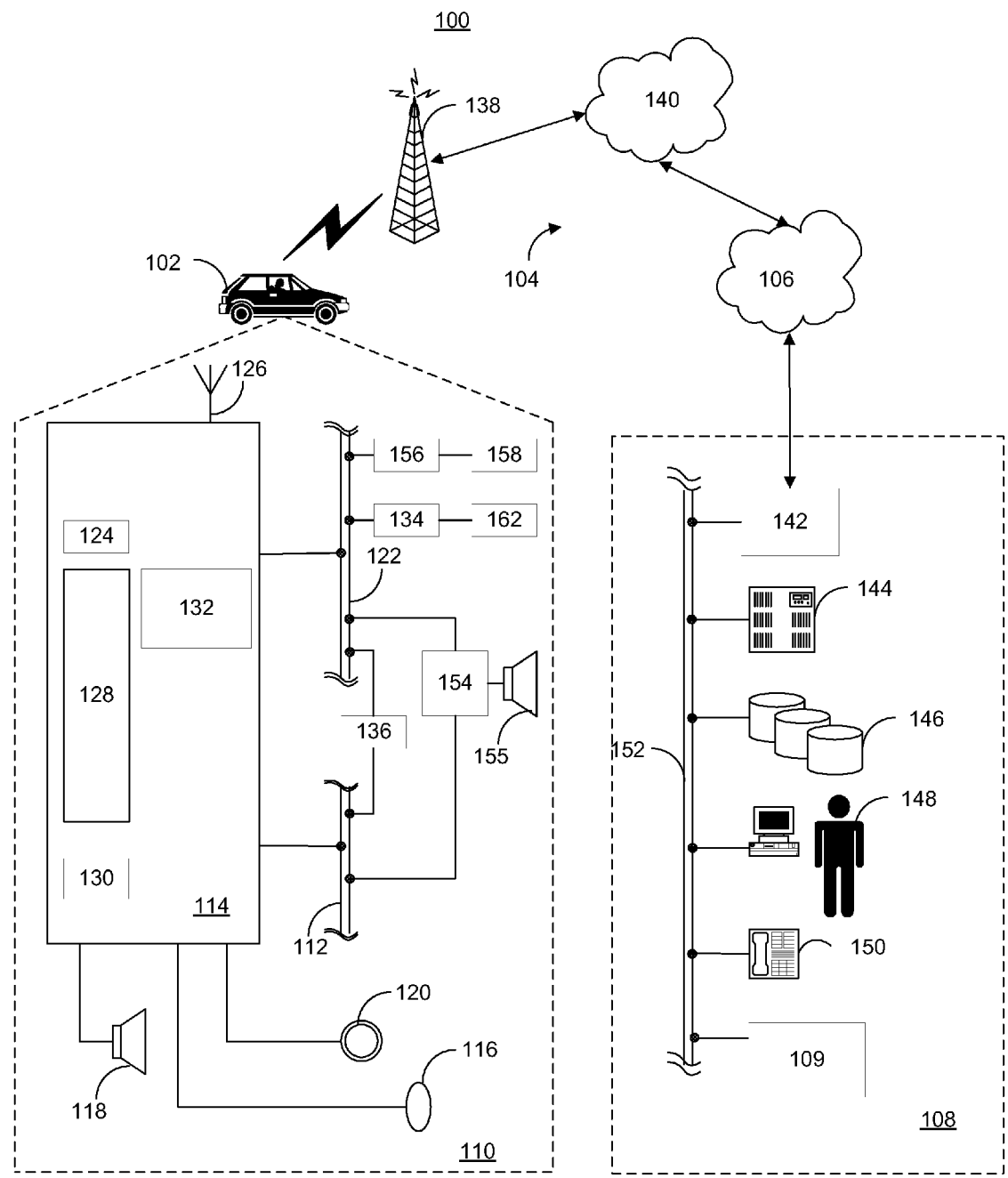
FIG. 1 is a schematic diagram of an operating environment for a mobile vehicle communication system usable in implementations of the described principles.

An exemplary computing and network communications environment is described hereinafter, it will be appreciated that the described environment is an example, and does not imply any limitation regarding the use of other environments to practice the invention. With reference to FIG. 1 there is shown an example of a communication system 100 that may be used with the present method and system and generally includes a vehicle 102, a mobile wireless network system 104, a land network 106 and a communications center 108. It should be appreciated that the overall architecture, setup and operation, as well as the individual components of the communication system 100 is generally known in the art. In accordance with an illustrative example, the communication center 108 includes a GNSS control center 109 incorporating functional components facilitating over-the-air configuration of GNSS receivers integrated with/within telematics units such as a telematics unit 114. Thus, the following paragraphs provide a brief overview of an exemplary communication system 100. However, other systems are contemplated that are capable of incorporating the described GNSS receiver and GNSS control center functionality described herein.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via mobile wireless communications. The vehicle 102 includes hardware 110 such as, for example, the telematics unit 114, a microphone 116, a speaker 118 and buttons and/or controls 120 integrated with the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 provides a variety of services through communications with the communications center 108. The telematics unit 114 includes an electronic processor 128, electronic memory 130, a mobile wireless component 124 including a mobile wireless chipset, a dual function antenna 126 (both GNSS and mobile wireless signal), and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114. The telematics unit 114 may also communicate with other telematics-equipped vehicles using the aforementioned communications components.

The telematics unit 114 provides, for users, an extensive/extensible set of services. Examples of such services include: GNSS-based mapping/location identification, turn-by-turn directions and other navigation-related services provided in conjunction with the GNSS component 132, and airbag deployment notification and other emergency or roadside assistance-related services provided in connection with various crash and or collision sensor interface modules 156 and crash sensors 158 located throughout the vehicle.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports information-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art. The above examples are merely a small subset of the services that the telematics unit 114 is capable of offering to users. Moreover, the telematics unit 114 includes a number of known components in addition to those listed above that have been excluded since they are not necessary to understanding the functionality discussed herein below.

Vehicle communications use radio transmissions to establish a communications channel with the mobile wireless network system 104 so that both voice and data signals can be sent and received via the communications channel. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component.

The microphone 116 provides the driver or other vehicle occupant with a means for inputting verbal or other auditory commands, and can be equipped with an embedded voice processing unit utilizing a human/machine interface (HMI) technology known in the art. The speaker 118 provides verbal output to the vehicle occupants and can be either a standalone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 may contain a speaker system 155, or may utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control.

The mobile wireless network system 104 is, for example, a cellular telephone network system or any other suitable wireless system that transmits signals between mobile wireless devices, such as the telematics unit 114 of the vehicle 102, and land networks, such as the land network 106. In the illustrative example, the mobile wireless network system 104 includes a set of cell towers 138, as well as base stations and/or mobile switching centers (MCSs) 140, as well as other networking components facilitating/supporting communications between the mobile wireless network system 104 with the land network 106. For example, the MSC 140 includes a remote data server.

As appreciated by those skilled in the art, the mobile wireless network system includes various cell tower/base station/MSC arrangements. For example, a base station and a cell tower could be co-located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

The communications center 108 is configured to provide a variety of back-end services and application functionality to the hardware 110. The communications center 108 includes, by way of example, network switches 142, servers 144, databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium. e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center.

Figure 2:
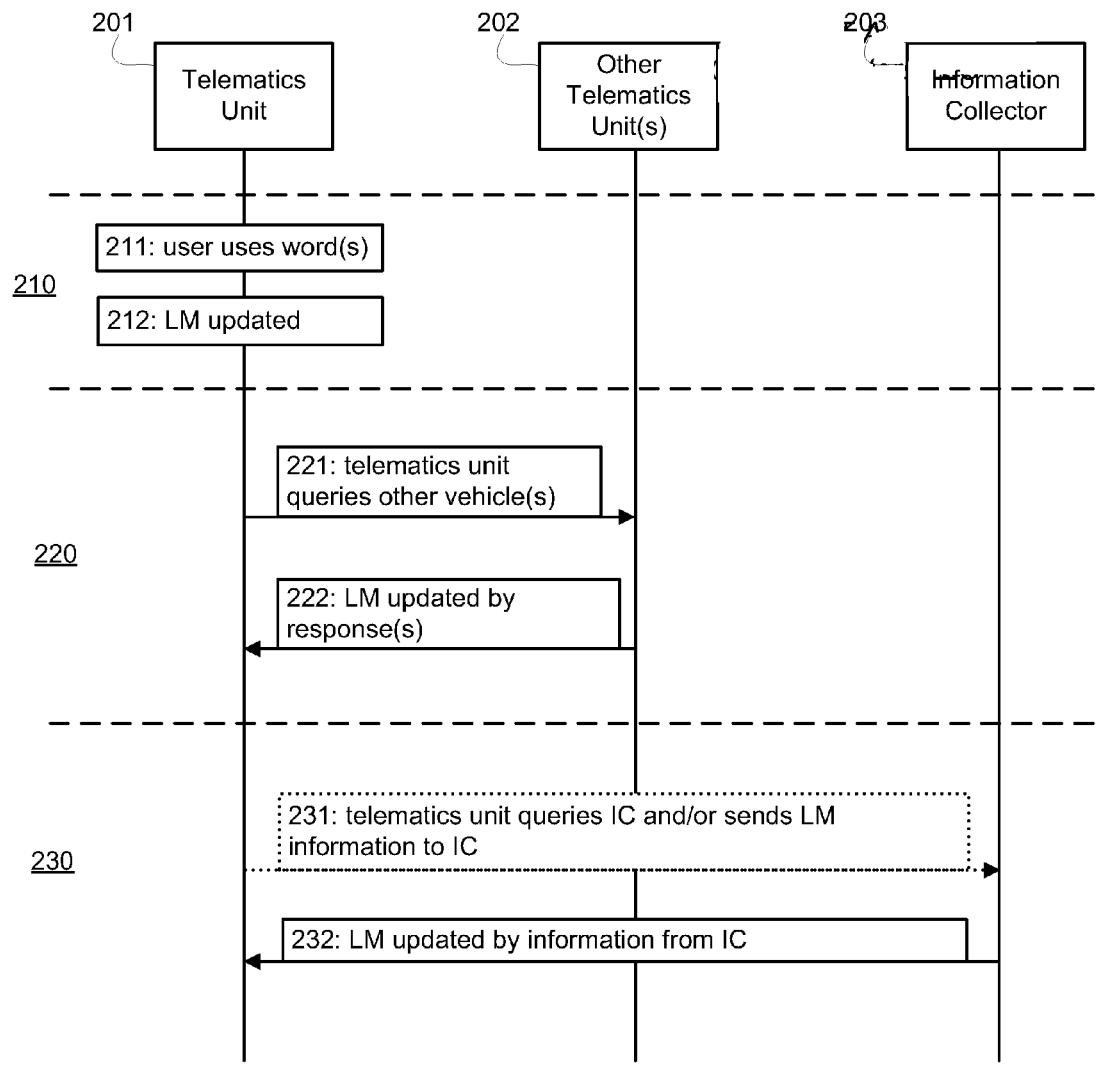
FIG. 2 is a diagram illustrating processes for updating a language model in accordance with an implementation of the described principles.

With further reference to the architecture of FIG. 1, and turning more specifically to FIG. 2, processes 210, 220, and 230 are depicted for updating the language model of a telematics system. In process 210 depicted by FIG. 2, a host user of a telematics unit 201 communicates via the telematics unit for example, using a vehicle spoken commands interface or making a call through the telematics unit. During this communication when the user uses a word or combination of words 211, the language model is updated 212 based on the word's or combination of words frequency or probability of use over the course of the communication. For example, the initial probability for word w may be stored by the language model as P(w). When the user uses word w at a rate corresponding to a probability R(w) in a new communication, the language model is adjusted to factor in the new probability with the old based on the length of the new communication in comparison to the length of all prior communications. After factoring in the new probability R(w) with the old probability P(w) accordingly, the language model updates the probability of word w from P(w) to P' (w). While the present example describes the language model in terms of probability, it will be appreciated that the language model may also be described in terms of frequency of word use or other similar parameters.

In addition to updating the language model used on a user communication from the user, process 220 depicted in FIG. 2 shows that a telematic unit's language model can be updated by querying other telematics units 202 in a distributed system (e.g., a system where language model data is aggregated through numerous encounters of telematics units with other telematics units). The telematics unit 201 queries other telematics units 202 of other vehicles at stage 221, for example, when the telematics unit 201 detects that another telematics unit 202 is within range of the telematics unit 201 (e.g., within range of being able to communicate over short-range wireless protocols). The query sent from one telematics unit to another telematics unit at stage 221 can include a request to update a certain number of words or word combinations. For example, given a limited timeframe where vehicles are passing one another, the two telematics units could exchange information on a small number of words or combinations (e.g., the three most recent words or combinations used). In another example, where vehicles are stationary or moving slowly and within range of one another, a larger number of words or combinations may be exchanged.

At stage 222, the telematics unit 201 receives frequency or probability data from other telematics units 202, and the language model of the telematics unit 201 is updated. In this implementation each telematics unit serves as both an information provider and an information collector. While the telematics unit 201 is receiving frequency or probability data and updating its language model, it is also sending its own frequency or probability data to the other telematics units so they can update their language models. In a further implementation, it will be appreciated that the exchange of language model information may be triggered by detection of other telematics units within range.

Process 230 corresponds to an implementation involving a centralized information collector 203, where the telematics unit 201 and other telematics units serve as information providers. The information collector 203 can be a call center 108, or some other type of centralized database or information aggregator. In this implementation, the telematics unit 201 queries the information collector and/or sends language model information (frequency data) at stage 231. The information collector then updates its database, which contains information collected from telematics unit 201 as well as other telematics units. At stage 232, the centralized information collector 203 sends this data to the telematics unit 201 so that its language model is updated to correspond to the aggregation of information collected by the information collector 203.

It will be appreciated that the telematics unit 201 may query the information collector 203 automatically or based on a predetermined trigger. It will further be appreciated that in some implementations, the telematics unit 201 does not have to send a query for information and instead receives pushed frequency or probability data that is transmitted or broadcast from the information collector 203.

Process 220 corresponds to a distributed information aggregation system while process 230 corresponds to a centralized information aggregation system, but it will be appreciated that processes 220 and 230 may be combined in a hybrid information aggregation system, were a telematics unit updates its language model based on information received from other telematics units 202 as well as from a centralized information collector 203. Thus, it will be appreciated that the information aggregation system can be centralized, distributed, or a hybrid that utilizes features of both the described centralized and distributed information aggregation systems.

It will further be appreciated that frequency or data information for building language models may be specific to a particular dialect, language, and/or geographic region. In one exemplary implementation, telematics units include associated type information (e.g., that identifies the dialect, language, or a geographic region) corresponding to language model information being transmitted, so that other telematics units 202 and/or the information collector 203 can properly process such information. For example, a vehicle with a driver that speaks one language may not need to exchange information with a vehicle of another driver that speaks a different language, and thus the telematics unit could be configured to ignore language model information associated with other dialects, languages, or geographic regions. In another example, the information collector 203 can separately aggregate information associated with dialects, languages, or geographic regions and develop separate sets of language model information for each category. Then, upon receiving a request from a telematics unit for language model information from one or more of those categories (e.g., a bilingual person that requires a telematics unit with a language model for two languages), the information collector 203 is able to send only the language model information that is responsive to that request (e.g., by sending the language model information for those two languages to the telematics unit of the exemplary bilingual person).

While FIG. 2 describes systems and methods through which an accurate and reliable language model can be developed through aggregation of frequency or probability information, specific users of telematics unit have a privacy interest in the frequency or probability information that can be associated with them. Thus, according to an implementation of the present invention, a process 300 depicted by FIG. 3 is provided to avoid interfering with the users' privacy.

Figure 3:
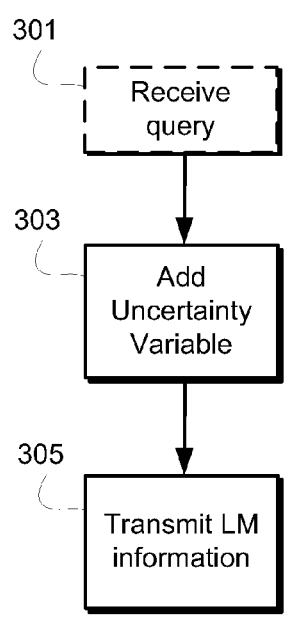
FIG. 3 is a flowchart illustrating a process for maintaining users' privacy by adding an uncertainty value to frequency or probability data in accordance with an implementation of the described principles.

As shown in FIG. 3, a telematics unit receives a query for frequency or probability information at stage 301. An uncertainty variable is added to the frequency or probability information at stage 303 before the frequency or probability information is transmitted to the entity performing the query (e.g., another telematics unit or a centralized information collector) at stage 305. It will be appreciated that the frequency or probability information sent in response to a query or sent to a centralized information collector may include an entire language model, information corresponding to a set of requested words, randomly selected words, etc. it will further be appreciated that a query at stage 301 might not be required, for example, when a telematics unit is sending its language model information to a centralized information collector, which may or may not be in response to a query from the information collector. Additionally, limitations may be put in place to prevent a single word from being queried too frequently to avoid receiving redundant information.

To give an example, if Joe queries Bob to update the probability corresponding to the word "winning" in the language model of Joe's telematics device, Bob sends back to Joe a probability which is equal to the actual probability plus a random value or Gaussian noise factor. It will be appreciated that the probability corresponding to a word corresponds to the probability of that word being used, which, for example, can be measured as the number of times that word has previously been used out of the total number of times all words have been used. The noise can be more dominant than the original frequency itself and can even cause a probability to be transmitted that is outside of the range of 0 to 1. Specifically, in this example, the probability corresponding to the word "winning" in Bob's language model may be a value such as 0.3. Noise is added to that value from a fixed distribution with a known mean. In a particular example using a Gaussian noise distribution with a zero mean having a standard deviation of 1 (i.e., $N(0,1)$), a random number is added to the actual probability, for example, −0.4, so Bob transmits to Joe that the probability corresponding to the word "winning" is 0.3±(−0.4), which is −0.1. While this result, taken alone, would not make sense, after Joe has a large enough sample size (e.g., after Joe has queried thousands of other telematics units for the probability of the word "winning," all of which have returned a probability with an added uncertainty values according to the Gaussian noise distribution, Joe's telematics unit is able to ascertain what the average probability associated with the word "winning" with a high degree of confidence. The uncertainty introduced by each individual response is cancelled out when a large number of responses is aggregated because the average added uncertainty approaches the zero mean with larger sample size. It will, be appreciated that non-zero means may also be used, which would involve subtracting the known non-zero means from the aggregated responses.

Figure 4:
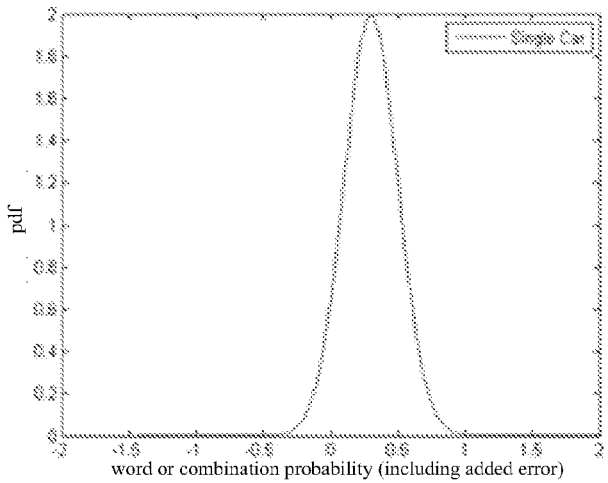
FIGS. 4-6 are graphs illustrating examples of probability density functions associated with transmitted word or combination probability including added Gaussian error.
Figure 5:
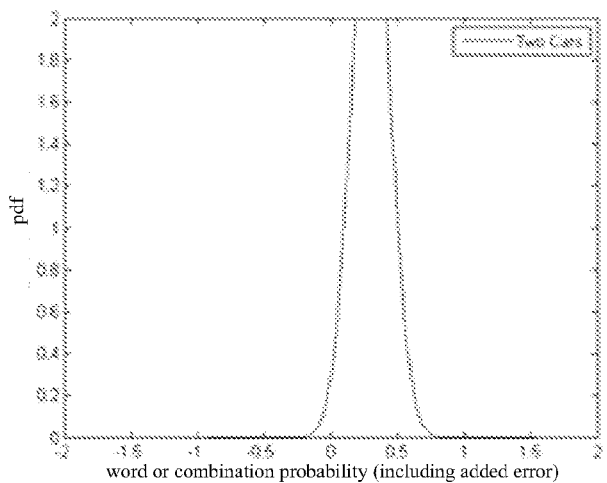
Figure 6:
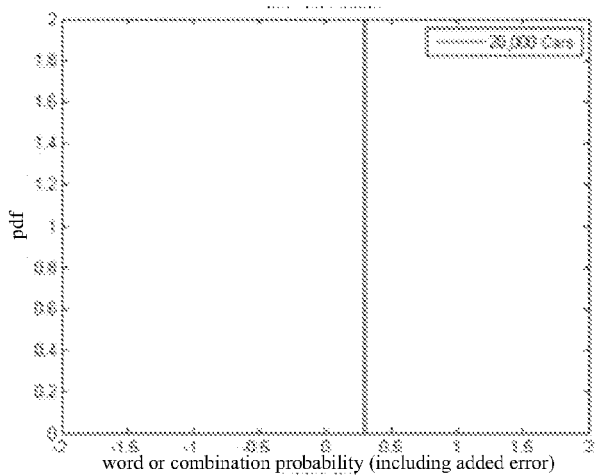

In another example, an uncertainty value is added to an actual probability based on a Gaussian probability density function (pdf). Graphs 400, 500 and 600 of FIGS. 4, 5 and 6 respectively depict exemplary probability density functions corresponding to situations where the actual probability corresponding to a word or combination is about 0.3, but a Gaussian distribution of noise is added to protect the user's privacy. In each of the graphs the y-axis represents a non-normalized pdf and the x-axis represents the transmitted probability for a word.

Graph 400 depicts the probability density function (pdf) corresponding to a word or combination with Gaussian noise added, taking into account the data from only a single vehicle. The peak of the pdf is at the actual probability, but there remains a significant likelihood that the actual value is not the value that is transmitted by that vehicle. Graph 500 depicts the probability density function corresponding to the same word or combination except in view of the data from two vehicles. As can be seen from graph 500, the probability density function corresponding to that word or combination is now narrower, indicating that the degree of error is getting smaller and that the average of the data from the two vehicles has a higher peak (indicating that the actual average probability corresponding to the word or combination is more likely to be reliable than in the one vehicle scenario). Graph 600 shows the probability density function in view of the data from 20,000 vehicles, and with such a large sample size, the degree of error introduced by adding Gaussian noise to each individual probability has practically disappeared.

It will be appreciated that frequency or probability data can be collected from a variety of sources and is not limited to data from communications made in conjunction with a telematics unit. For example, frequency data can be collected from a communication on a cell phone outside of the range of the telematics unit and retrieved from the cell phone by the telematics unit to update the language model of the telematics unit.

It will also be appreciated that implementations of the present invention can be used to collect data in other contexts and is not limited to collecting data for language modeling. For example, the present invention can be used to collect data pertaining to average vehicle speed, mileage, RPM and other driver data, while protecting users' privacy.

It will thus be appreciated that the described system and method allows for the collection of data for language modeling while maintaining the privacy of users. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-implemented method for statistical data learning under privacy constraints, the method comprising:
   receiving, by a processor, a plurality of pieces of uncertain statistical information relating to a statistical object from a plurality of telematics units, wherein each piece of uncertain statistical information corresponds to an uncertainty variable having been applied to a corresponding piece of actual statistical information by a respective telematics unit from which the piece of uncertain statistical information was received, wherein the uncertainty variable corresponds to noise added by the respective telematics unit according to a common function having a predetermined mean implemented by each of the plurality of telematics units; and
   aggregating, by the processor, the plurality of pieces of uncertain statistical information to generate an estimated value corresponding to the statistical object.

2. The method of claim 1, wherein the common function is a Gaussian noise distribution.

3. The method of claim 1, wherein the predetermined mean is zero.

4. The method of claim 1, wherein the statistical object is a frequency or probability of use of a word in a language model, and each piece of uncertain and actual statistical information corresponds to a frequency or probability of use of the word determined by the respective telematics unit.

5. The method of claim 1, further comprising:
   before the receiving step, querying, by the processor, the plurality of telematics units for the plurality of pieces of uncertain statistical information relating to the statistical object.

6. The method of claim 1, wherein the computer-implemented method is executed according to computer-executable instructions at a centralized information aggregator.

7. The method of claim 6, wherein the centralized information aggregator is a call center.

8. The method of claim 7, further comprising:
   transmitting, by the call center, the estimated value corresponding to the statistical object to one or more telematics units.

9. The method of claim 1, wherein the computer-implemented method is executed according to computer-executable instructions at a first telematics unit, and the plurality of pieces of uncertain statistical information are received from other telematics units.

10. The method of claim 1, wherein the statistical object is an average vehicle speed, mileage, or revolutions per minute (RPM).

11. A non-transitory computer-readable medium having computer-executable instructions stored thereon for statistical data learning under privacy constraints, the computer-executable instructions, when executed by a processor, causing the following steps to be performed:
   receiving a plurality of pieces of uncertain statistical information relating to a statistical object from a plurality of telematics units, wherein each piece of uncertain statistical information corresponds to an uncertainty variable having been applied to a corresponding piece of actual statistical information by a respective telematics unit from which the piece of uncertain statistical information was received, wherein the uncertainty variable corresponds to noise added by the respective telematics unit according to a common function having a predetermined mean implemented by each of the plurality of telematics units; and
   aggregating the plurality of pieces of uncertain statistical information to generate an estimated value corresponding to the statistical object.

12. The computer-readable medium of claim 11, wherein the common function is a Gaussian noise distribution.

13. The computer-readable medium of claim 11, wherein the predetermined mean is zero.

14. The computer-readable medium of claim 11, wherein the statistical object is a frequency or probability of use of a word in a language model, and each piece of uncertain and actual statistical information corresponds to a frequency or probability of use of the word determined by the respective telematics unit.

15. The computer-readable medium of claim 11, wherein the computer-executable instructions, when executed by a processor, further cause the following step to be performed:
   before the receiving step, querying the plurality of telematics units for the plurality of pieces of uncertain statistical information relating to the statistical object.

16. The computer-readable medium of claim 11, wherein the computer-readable medium is part of a centralized information aggregator.

17. The computer-readable medium of claim 16, wherein the computer-executable instructions, when executed by a processor, further cause the following step to be performed:
   transmitting the estimated value corresponding to the statistical object to one or more telematics units.

18. The computer-readable medium of claim 11, wherein the computer-readable medium is part of a first telematics unit, and the plurality of pieces of uncertain statistical information are received from other telematics units.

* * * * *